(12) United States Patent
Ruiz

(10) Patent No.: US 7,469,678 B2
(45) Date of Patent: Dec. 30, 2008

(54) ADAPTIVE MBT SPARK ADVANCE FOR CONVENTIONAL POWERTRAINS

(75) Inventor: Victoriano Ruiz, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 33 days.

(21) Appl. No.: 11/758,903

(22) Filed: Jun. 6, 2007

(65) Prior Publication Data
US 2008/0183374 A1    Jul. 31, 2008

Related U.S. Application Data

(60) Provisional application No. 60/898,419, filed on Jan. 30, 2007.

(51) Int. Cl.
*F02P 5/00* (2006.01)

(52) U.S. Cl. .............. 123/406.11; 123/406.23; 123/406.33

(58) Field of Classification Search ............ 123/406.11, 123/406.12, 406.23, 406.24, 406.33
See application file for complete search history.

(56) References Cited

U.S. PATENT DOCUMENTS

| | | | | | |
|---|---|---|---|---|---|
| 4,896,639 | A | * | 1/1990 | Holmes | 123/406.24 |
| 4,984,454 | A | * | 1/1991 | Feller et al. | 73/114.32 |
| 5,168,853 | A | * | 12/1992 | Kittelson et al. | 123/406.23 |
| 5,297,048 | A | * | 3/1994 | Gauer | 701/115 |
| 5,924,404 | A | * | 7/1999 | Ruman et al. | 123/406.18 |
| 6,339,743 | B1 | * | 1/2002 | Young et al. | 701/115 |

* cited by examiner

*Primary Examiner*—John T Kwon

(57) ABSTRACT

An engine control system to adaptively adjust the spark timing values in spark timing tables to achieve a mean best torque. The engine control system utilizes a spark timing module that contains spark timing values as a function of one or more operating conditions of an engine. An ignition module can command spark timing based on the timing values in the spark timing module. The ignition module can adjust the spark timing during engine operation within a predetermined operating window. The spark timing values in the spark timing module can be changed based on changes in engine operation as a result of the adjustment to the spark timing. The adjusting of the spark timing and the replacing of the spark timing values in the spark timing module can allow the spark timing in the spark timing module to be optimized.

20 Claims, 2 Drawing Sheets

ADAPTIVE MBT SPARK ADVANCE FOR CONVENTIONAL POWERTRAINS

Figure 1:
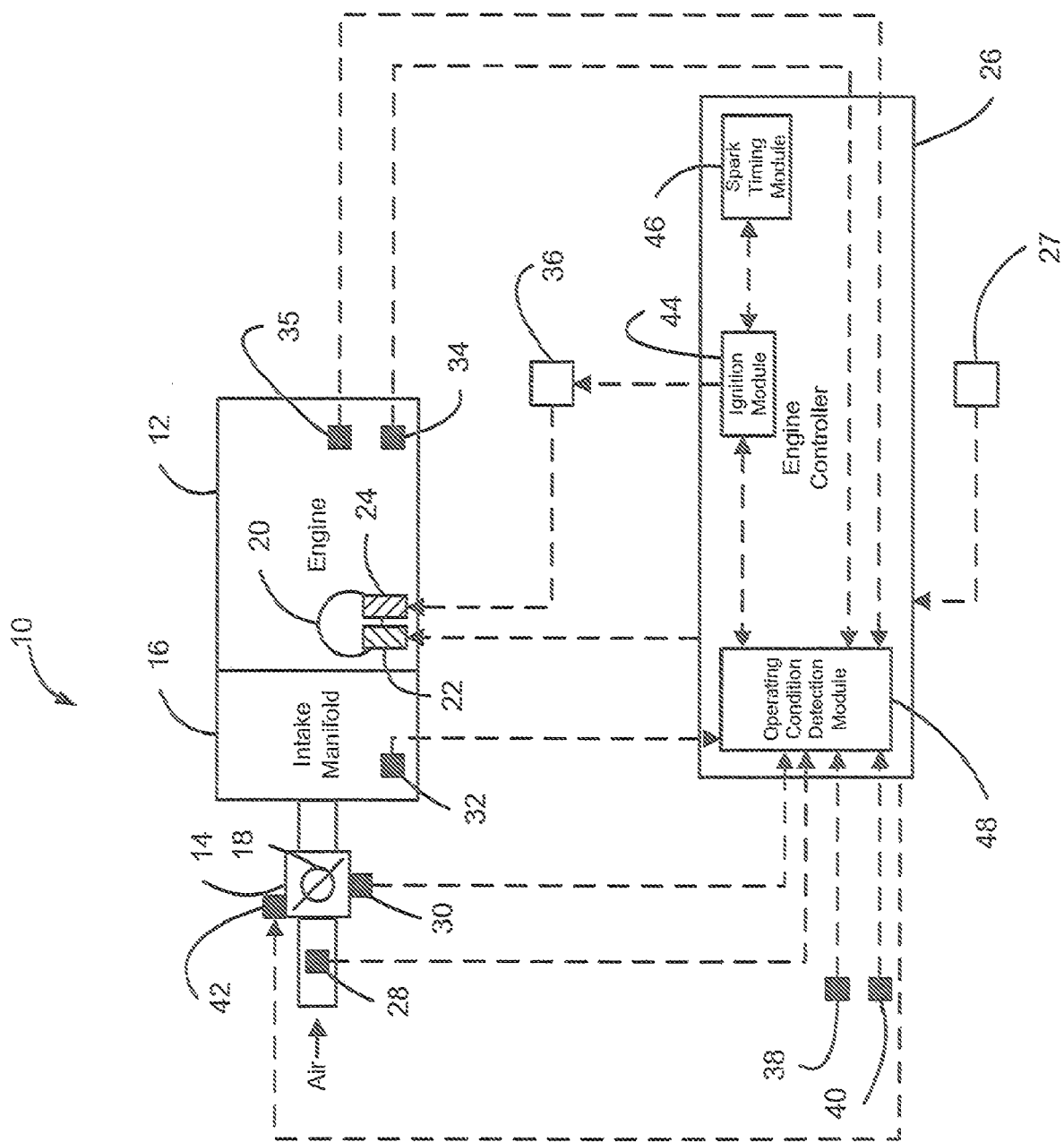

This application claims the benefit of U.S. Provisional Application No. 60/898,419, filed on Jan. 30, 2007. The disclosure of the above application is incorporated herein by reference.

FIELD

The present disclosure relates to engine control systems, and more particularly to an adaptive mean best torque (MBT) spark advance control system for conventional powertrains.

BACKGROUND

The statements in this section merely provide background information related to the present disclosure and may not constitute prior art.

A typical vehicle engine relies on internal combustion within engine cylinders to provide torque. A spark generated by a sparkplug ignites a mixture of air and fuel within the cylinders to cause combustion. Spark timing and control of the air/fuel mixture determine the performance of the engine.

Internal combustion engine control systems are typically steady-state, throttle-based control systems. In the steady-state control systems, the torque output of the engine is adjusted to match a load placed on the engine. The load on the engine can change. For example, the load can be changed by a driver adjusting a position of an accelerator pedal. The engine control system adjusts the operation of the engine to match the changing load placed on the engine.

The engine control system selects a spark timing for the engine primarily as a function of the engine speed (RPM) and load. Compensation can be made for other factors (e.g., temperature, altitude, and other environmental conditions). The spark timing is selected from a set of tables accessed by the engine control system.

The values of spark timing in the tables are typically set to achieve mean best torque for the associated operating conditions. Operating at the mean best torque results in the best brake-specific fuel consumption at stoichiometry. The spark timing in these tables is generated on an engine dynamometer on a few engines and then adjusted on the vehicle during development. These values of spark timing are programmed into the memory accessed by the engine control system and used on all engines for that application. The values of the spark timing that generate the best torque are usually borderline with detonation. To avoid premature detonation, a knock sensor in conjunction with a knock detection algorithm can retard the spark advance from the timing value provided by the table.

Due to production differences during manufacturing and aging of the engine and associated components through its lifespan, the spark timing for mean best torque can differ from the programmed tabulated data utilized by the engine control system. Thus, the spark timing in the tabulated data can result in not achieving the mean best torque and, as a result, not achieving the best brake-specific fuel consumption at stoichiometry.

SUMMARY

Accordingly, the present disclosure provides an engine control system to adaptively adjust the spark timing values in the tables to achieve a mean best torque. The engine control system utilizes a spark timing module that stores spark timing values in a non-volatile memory as a function of one or more operating conditions of an engine. An ignition module can command spark timing based on the spark timing values stored in the spark timing module. The ignition module can adjust the spark timing during engine operation within a predetermined operating window. The spark timing values in the non-volatile memory of the spark timing module can be replaced based on a change in engine torque output as a result of the adjustment to the spark timing. The adjusting of the spark timing and replacing the spark timing values in the non-volatile memory of the spark timing module can allow the spark timing values in the non-volatile memory of the spark timing module to be optimized throughout the engine's useful life.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
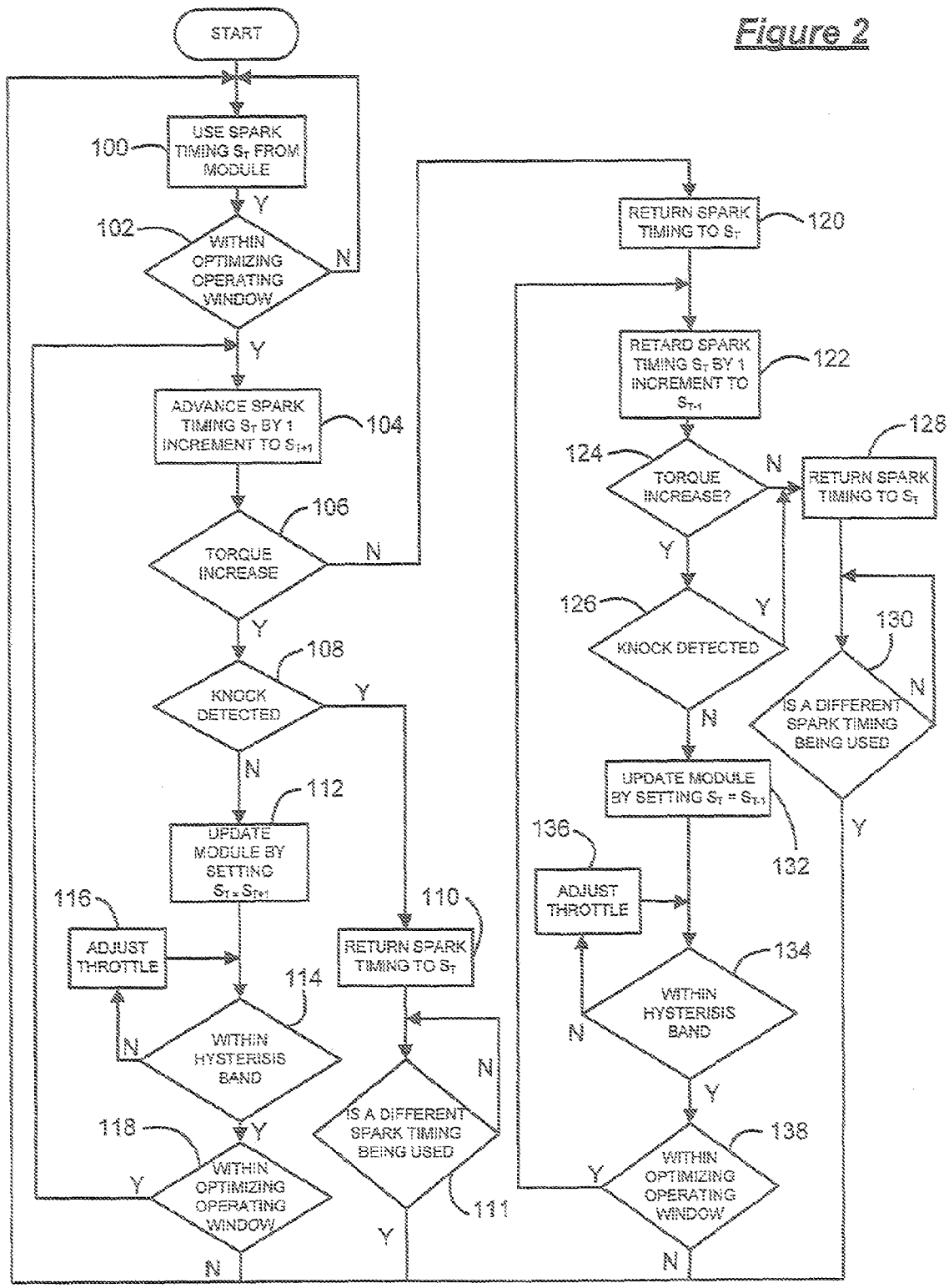

FIG. 1 is a schematic illustration of an exemplary engine control system according to the present disclosure; and FIG. 2 is a flowchart illustrating steps performed by the engine control system according to the present disclosure.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle system 10 includes an engine 12. Engine 12 includes a throttle 14 and an intake manifold 16. Airflow through throttle 14 and into intake manifold 16 is based on a position of a throttle plate 18. Air flows into individual cylinders 20 of engine 12. Although only a single cylinder 20 is shown, it is appreciated that engine 12 can include multiple cylinders 20. Cylinder 20 includes a piston (not shown) that compresses an air/fuel mixture. More specifically, airflow into cylinder 20 is mixed with fuel injected by a fuel injector 22. A sparkplug 24 ignites the compressed air/fuel mixture in a combustion process to produce engine torque.

A controller 26 can contain one or more modules and controls engine 12 and its torque output. Controller 26 utilizes the adaptive mean best torque (MBT) spark advance control of the present disclosure to optimize the spark timing for operation of engine 12. Controller 26 adjusts the engine torque based on a requested or reference torque. For example, controller 26 can receive a requested torque command from a driver input device 27, such as an accelerator pedal, a hand-operated throttle control, or a computer-based input device. Input device 27 can provide controller 26 with a signal indicative of a desired torque output or a desired torque change.

Controller 26 communicates with a mass airflow (MAF) sensor 28, a throttle position sensor (TPS) 30, a manifold absolute pressure (MAP) sensor 32, an engine speed sensor 34, and one or more knock sensor(s) 35. MAF sensor 28 generates a signal indicating the amount of airflow through throttle 14. TPS 30 generates a signal indicating the position of throttle plate 18. MAP sensor 32 generates a signal indicating the pressure within the intake manifold 16. Engine speed sensor 34 generates a signal indicating the engine speed (RPM). Knock sensor(s) 35 generates a signal that engine controller 26 can utilize to ascertain if knock is occurring during operation of engine 12. Controller 26 also communicates with fuel injector 22 to control the fuel rate provided to cylinder 20 and an ignition system 36 to control timing of the ignition spark. Ambient pressure and temperature signals are generated by ambient pressure and temperature sensors 38, 40, respectively, and are communicated to controller 26. Controller 26 also communicates with a throttle actuator 42. Throttle actuator 42 can adjust the position of throttle plate 18 based on commands received from controller 26.

Controller 26 can include multiple modules to control and operate engine 12 and vehicle system 10. Alternatively, controller 26 can be a single integral module. Controller 26 executes the adaptive MBT spark advance control of the present disclosure. Controller 26 can include an ignition module 44 that communicates with ignition system 36. Ignition module 44 can command ignition system 36 to fire sparkplug 24 with a desired timing.

Controller 26 can include a spark timing module 46 that communicates with ignition module 44. Spark timing module 46 stores tabulated values for spark timing $S_T$ used by ignition module 44 in commanding ignition system 36 to fire sparkplug 24. The spark timing values $S_T$ in spark timing module 46 can be tabulated as a function of the engine speed (RPM) and the load. Optionally, the spark timing values $S_T$ can also be tabulated as a function of other environmental conditions, such as ambient temperature, pressure, and altitude. Spark timing module 46 stores the spark timing values $S_T$ in non-volatile memory.

The initial spark timing values $S_T$ in spark timing module 46 are the universal values generated for use with a family of engines 12. The adaptive MBT spark advance control of the present disclosure adaptively replaces the spark timing values $S_T$ in spark timing module 46 to optimize the operation of engine 12, as described below.

Controller 26 can include an operating condition detection module 48 that communicates with ignition module 44. Operating condition detection module 48 can monitor the operating condition of engine 12 and system 10 and allow ignition module 44 to retrieve information related to the operating condition of engine 12 and/or vehicle system 10. Operating condition detection module 48 receives signals from MAF sensor 28, TPS 30, MAP 32, engine speed sensor 34, knock sensor 35, ambient pressure sensor 38, and ambient temperature sensor 40. Operating condition detection module 48 utilizes these various inputs to ascertain the load on engine 12 and the engine speed, along with other operating conditions, so that ignition module 44 can extract the appropriate spark timing value $S_T$ from spark timing module 46 and command ignition system 36 to fire sparkplug 24 with the appropriate timing.

Ignition module 44 can overwrite or change the spark timing values $S_T$ in spark timing module 46 based on the adaptive MBT spark advance control of the present disclosure. The adaptive MBT spark advance control according to the present disclosure is implemented by ignition module 44. Ignition module 44 monitors the operating conditions of engine 12, retrieves the appropriate spark timing value $S_T$ from spark timing module 46, and commands ignition system 36 to fire a sparkplug 24 with the retrieved spark timing value $S_T$. When operation of engine 12 is within an optimizing operating window, ignition module 44 adjusts the spark timing and ascertains a resulting change in operation of engine 12. The optimizing operating window can vary or be different for differing operating conditions of engine 12. For example, an optimizing operating window can include a time period wherein engine 12 is in steady-state operation. One example of steady-state engine operation includes a constant load demand being applied to the engine.

The change in engine performance as a result of adjusting the timing can be ascertained by determining a change in torque output of engine 12. A change in the torque output of engine 12 can be indicated by a change in engine speed (RPM) as reported by engine speed sensor 34 or by an actual torque sensor (not shown) that measures a torque value of engine 12, among other ways.

Along with changing the spark timing and monitoring a change in engine performance, the adaptive MBT spark advance control also ascertains if engine knock occurs. If a positive change in the performance of engine 12 is realized without causing knock, the spark timing value $S_T$ retrieved from spark timing module 46 is overwritten/replaced in the non-volatile memory to reflect the new spark timing that improved performance of engine 12.

The spark timing can continue to be adjusted (advanced or retarded) and the change in engine performance ascertained as long as engine 12 is operating within an optimizing operating window. This procedure can continue to occur until a spark timing corresponding to mean best torque is realized and written into the non-volatile memory of spark timing module 46.

During this process, the operating speed (RPM) of engine 12 is maintained within a predetermined hysterisis band (e.g., initial engine speed ±50 RPM). The band can be different for different operating conditions. The operating band can be chosen to provide a negligible or imperceptible change in engine operation to an operator of vehicle system 10.

Thus, by executing the adaptive MBT spark advance control of the present disclosure, the spark timing values $S_T$ stored in spark timing module 46 can be adaptively replaced during operation of engine 12. The new spark timing values can provide a mean best torque without causing engine knock.

Referring now to FIG. 2, the steps executed by the adaptive MBT spark advance control according to the present disclosure will be described in detail. During operation of engine 12, ignition module 44 implements the adaptive MBT spark advance control of the present disclosure. Specifically, when engine 12 is running, control, in step 100, uses spark timing $S_T$ from the non-volatile memory of spark timing module 46 to operate engine 12. Ignition module 44 causes ignition system 36 to fire sparkplug 24 with the spark timing $S_T$ retrieved from spark timing module 46. In step 102, control determines if engine 12 is within an optimizing operating window. If engine 12 is not operating within an optimizing operating window, control returns to step 100 and continues to use spark timing $S_T$ from spark timing module 46 until engine 12 is within an optimizing operating window.

When engine 12 is operating within an optimizing operating window, control moves to step 104. In step 104, control advances the spark timing $S_T$ by one increment to $S_{T+1}$. For example, control can advance the spark timing by 1 degree. It should be appreciated that the increment by which the spark timing $S_T$ is advanced can differ from 1 degree increments. Ignition system 36 changes the timing of sparkplug 24 to spark timing $S_{T+1}$.

In step 106, control ascertains if a torque increase in the output of engine 12 has occurred. A change in torque can be ascertained by a change in the engine speed as reported by engine speed sensor 34 or by an actual torque measure by a torque-measuring sensor (not shown). An increase in torque due to the advancing of the spark timing by one increment indicates that the spark timing $S_T$ in spark timing module 46 is not set to produce the mean best torque. As a result, improvements in the values of the spark timing $S_T$ in spark timing module 46 can be made.

If torque increases at step 106, control continues to decision block 108. The torque increase indicates that an improved spark timing may be utilized. As such, control, in step 108, ascertains if the operation of engine 12 with the advanced spark timing $S_{T+1}$ results in engine 12 knocking. If knocking is detected, then the spark timing for engine 12 is knock limited for the current operating conditions and control returns the spark timing to $S_T$ (the existing spark timing $S_T$ in spark timing module 46), as indicated in step 110.

With the current spark timing for engine 12 being knock limited, control monitors the spark timing being utilized from spark timing module 46 to look for a new opportunity to optimize the spark timing values in spark timing module 46. A new opportunity occurs when ignition module 44 commands a change in spark timing (a different spark timing from spark timing module 46 than the just evaluated spark timing). Specifically, control ascertains if a different spark timing from spark timing module 46 is being utilized by ignition module 44, as indicated in step 111. When a different spark timing is being used, a new opportunity to evaluate whether the different (new) spark timing provides a mean best torque for engine 12 is available and control returns to step 100 to seek improvements in the spark timing values in spark timing module 46. If a different spark timing is not yet being utilized, as determined in step 111, control continues to monitor the spark timing being commanded by ignition module 44 until a different spark timing is commanded and a new opportunity to optimize is presented, at which point control returns to step 100.

If engine knocking is not detected in step 108, then an improved spark timing $S_{T+1}$ has been discovered and control moves to step 112. In step 112, control replaces the spark timing value in the non-volatile memory of spark timing module 46 by setting $S_T=S_{T+1}$. The replacing of the spark timing value by the new advanced spark timing value results in spark timing module 46 now having a spark timing $S_T$ that results in an improvement in engine torque and operation closer to or equal to MBT operation.

In step 114, control determines if engine 12 is operating within a predetermined hysterisis band. The hysterisis band can be chosen to allow for some change in the engine speed (RPM) during implementation of the adaptive MBT spark advance control. For example, the hysterisis band can be ±50 RPM from the engine speed prior to altering the spark timing in step 104. The width of the hysterisis band can vary. For example, the width can vary based on the operating speed of engine 12 prior to implementing the adaptive MBT spark advance control and/or the application within which engine 12 is operating.

When engine 12 is operating outside the hysterisis band, control adjusts the position of throttle plate 18 in step 116. Specifically, control commands throttle actuator 42 to alter the position of throttle plate 18 to bring the engine speed back within the hysterisis band. Control continues to implement steps 114 and 116 until the engine speed is within the hysterisis band.

When engine 12 is operating within the hysterisis band, control moves to step 118. In step 118, control ascertains if engine 12 is still operating within the optimizing operating window. If the operation of engine 12 is no longer within the optimizing operating window, control returns to step 100 and uses spark timing $S_T$ from spark timing module 46 to operate engine 12. Control continues to monitor the operation of engine 12 to ascertain when another optimizing operating window presents itself, as indicated in step 102.

If engine 12 is still operating within the optimizing operating window, as determined in step 118, control returns to step 104. Control continues to implement steps 104, 106, 108, and 112-118 so long as advancing the spark timing results in an increase in torque, does not cause engine 12 to knock, and the operation of engine 12 remains within the optimizing operating window. This process enables control to seek the best spark timing for the current operating conditions of engine 12 and replace the values in the non-volatile memory of spark timing module 46 to reflect the improved timing value.

In some situations, the advancing of the spark timing value does not result in a torque increase and improvement in performance of engine 12. The non-increase in the engine torque as a result of advancing the spark timing $S_T$ by one increment can indicate that the current spark timing value in spark timing module 46 results in an over-sparked (too much advance) condition or that the current spark timing value in spark timing module 46 is the value that results in mean best torque. The adaptive MBT spark advance control of the present disclosure can then look to see if retarding the spark timing results in an improvement in the performance of engine 12, as described below. An improvement in performance (torque increase) of engine 12 is indicative of an over-sparked (too much advance) condition and retardation of the spark timing can move the spark timing toward a value corresponding to MBT operation of engine 12.

If the advancing of the spark timing $S_T$ in step 104 does not result in a torque increase, as ascertained in step 106, control moves to step 120. In step 120, control returns the spark timing to $S_T$ (the value in spark timing module 46). In step 122, control retards spark timing $S_T$ by one increment to $S_{T-1}$.

In step 124, control ascertains if the retarding of the spark timing to $S_{T-1}$ results in a torque increase. If a torque increase is not realized, improvement in engine performance by retarding the spark timing is not available and control moves to step 128. In step 128, control returns the spark timing to $S_T$ (the current value in spark timing module 46).

After implementing step 128, control monitors the spark timing being utilized from spark timing module 46 to look for a new opportunity to optimize the spark timing values in spark timing module 46. A new opportunity occurs when ignition module 44 commands a change in spark timing (a different spark timing from spark timing module 46 than the just evaluated spark timing). Specifically, control ascertains if a different spark timing from spark timing module 46 is being utilized by ignition module 44, as indicated in step 130. When a different spark timing is being used, a new opportunity to evaluate whether the different (new) spark timing provides a mean best torque for engine 12 is available and control returns to step 100 to seek improvements in the spark timing values in spark timing module 46. If a different spark timing is not yet being utilized, as determined in step 130, control continues to monitor the spark timing being commanded by ignition module 44 until a different spark timing is commanded and a new opportunity to optimize is presented, at which point control returns to step 100.

If the retardation in spark timing results in a torque increase, as ascertained in step 124, a possible improvement to the spark timing has been identified and control implements step 126. In step 126, control ascertains if the retarded spark timing $S_{T-1}$ results in engine 12 knocking. If a knock condition is detected, then the possible improvement cannot be used and control moves to step 128 and returns the spark timing to $S_T$ (the current value in spark timing module 46).

If a knock condition is not detected in step 126, control moves to step 132. In step 132, control replaces the spark timing value in the non-volatile memory of spark timing module 46 by setting $S_T=S_{T-1}$. As a result, the value of the spark timing $S_T$ stored in spark timing module 46 is now a value that results in an increase in the torque output of engine 12 over the previous spark timing value stored in spark timing module 46.

In step 134, control ascertains if engine 12 is operating within the hysterisis band. If engine 12 is not operating within the hysterisis band, control adjusts the throttle, as indicated in step 136. Specifically, control commands throttle actuator 42 to adjust the position of throttle plate 18 to bring the speed of engine 12 back within the hysterisis band. Control continues to implement steps 134 and 136 until the speed of engine 12 is within the hysterisis band.

When the speed of engine of 12 is within the hysterisis band, control implements step 138. In step 138, control ascertains if engine 12 is still operating within the optimizing operating window. If engine 12 is no longer operating within the optimizing operating window, control returns to step 100 and uses spark timing $S_T$ from spark timing module 46 and awaits another opportunity to seek for improvements in the spark timing values in spark timing module 46.

If engine 12 is still operating within the optimizing operating window, as ascertained in step 138, control returns to step 122 and again retards the spark timing $S_T$ by one increment to $S_{T-1}$ and evaluates the change in engine torque as a result of the new retarded spark timing $S_{T-1}$. Control continues to implement steps 122, 124, 126, and 132-138 as long as the operation of engine 12 remains within the optimizing operating window, no knock is detected, and the retardation of the spark timing results in a torque increase. In this manner, the adaptive MBT spark advance control of the present disclosure allows control to continue to refine the spark timing values seeking the best spark timing for the current operating conditions of engine 12 and replaces the values in the non-volatile memory of spark timing module 46 to reflect the improved timing value.

Thus, the adaptive MBT spark advance control of the present disclosure monitors the operating condition of engine 12 and, whenever an optimizing operating window occurs, implements the adaptive MBT spark control of the present disclosure. The adaptive MBT spark advance control incrementally advances the spark timing and ascertains the resulting change in the engine torque. Control continues to advance the spark timing as long as an increase in torque is realized (indicative of an under-sparked condition) and engine knock does not occur. If a torque increase does not occur, control will begin incrementally retarding the spark advance and ascertain if an increase in torque occurs, thereby indicating that the retardation moves the operation of engine 12 more toward the MBT spark advance value. Control incrementally retards the spark timing until a torque increase is not achieved and/or a knock condition occurs.

Each time a torque increase is achieved without causing a knock, the spark timing value in the non-volatile memory of spark timing module 46 is overwritten/replaced to reflect the new spark timing value that improved the operation of engine 12. Once no more torque increase is achieved without causing knock, the optimized spark advance is then residing in spark timing module 46 for subsequent use in operation of engine 12. If the operation of engine 12 remains within the optimizing operation window for a sufficient duration and the spark timing is not knock limited, the corresponding spark timing value in spark timing module 46 will reflect the MBT spark advance for engine 12 for the particular operating parameters.

During the implementing of the MBT spark advance control, the engine speed is maintained within a predetermined band. Maintaining the engine speed within the predetermined band can provide for a pleasant experience of an operator of a vehicle employing vehicle system 10 during implementation of the MBT spark advance control and can provide a negligible or imperceptible change in engine operation.

Thus, the MBT spark advance control of the present disclosure can continuously seek to optimize the spark timing values in spark timing module 46 whenever an appropriate optimizing window condition occurs. This capability allows for the spark timing values to be replaced to reflect changing performance of engine 12 over time and can also account for environmental changes, such as changes in altitude, ambient temperature, and air density.

Those skilled in the art can now appreciate from the foregoing description that the broad teachings of the present disclosure can be implemented in a variety of forms. For example, while the adaptive MBT spark advance control is described as first implementing a spark advance and, if necessary, implementing a spark retardation while seeking to optimize the spark timing value, it should be appreciated that the spark timing can first be retarded and, if necessary, advanced when seeking the optimized spark timing value. Therefore, while this disclosure has been described in connection with particular examples thereof, the true scope of the disclosure should not be so limited since other modifications will become apparent to the skilled practitioner upon a study of the drawings, the specification, and the following claims.

What is claimed is:

1. An engine control system, comprising:
   a spark timing module that stores spark timing values in non-volatile memory as a function of one or more operating conditions of an engine; and
   an ignition module that commands spark timing based on a spark timing value stored in said spark timing module, adjusts said spark timing during engine operation within a predetermined operating window, and replaces said spark timing value in said non-volatile memory of said spark timing module based upon a change in torque output of said engine as a result of said adjustment to said spark timing.

2. The engine control system of claim 1, wherein said predetermined operating window includes steady-state engine operation.

3. The engine control system of claim 2, wherein said steady-state engine operation includes a constant load demand.

4. The engine control system of claim 1, wherein said ignition module replaces said spark timing value in said non-volatile memory of said spark timing module when said adjustment to said spark timing results in an increase in engine torque output.

5. The engine control system of claim 4, wherein said ignition module replaces said spark timing value in said non-volatile memory of said spark timing module when said adjustment to said spark timing results in an increase in engine torque output without causing engine knock.

6. The engine control system of claim 1, wherein said ignition module continues to adjust said spark timing while said engine is operating within said predetermined operating window and continues to replace said spark timing value in said non-volatile memory of said spark timing module to reflect said adjustment in said timing value until a mean best torque of the engine is achieved without causing engine knock.

7. The engine control system of claim 1, wherein said ignition module advances and retards said spark timing to ascertain a spark timing value that corresponds to a mean best torque of said engine and replaces said spark timing value in said non-volatile memory of said spark timing module to said spark value corresponding to said mean best torque of said engine.

8. The engine control system of claim 7, further comprising an engine control module that maintains an operating speed of said engine within a predetermined range while advancing and retarding said spark timing.

9. The engine control system of claim 1, further comprising an operating condition detection module that determines one or more operating conditions of said engine and wherein said ignition module uses operating conditions of said engine detected by said operating condition detection module to determine if operation of said engine is within said predetermined operating window.

10. The engine control system of claim 9, wherein said ignition module uses operating conditions of said engine detected by said operating condition detection module to determine an appropriate spark timing value to retrieve from said non-volatile memory of said spark timing module.

11. A method of adaptively optimizing engine performance, comprising:
monitoring an operational state of an engine powering a vehicle;
determining if engine operation is within a predetermined operating window;
implementing spark timing using a spark timing value stored in a non-volatile memory;
adjusting said spark timing based on operation within said predetermined operating window;
determining an effect on engine torque output as a result of adjusting said spark timing; and
replacing said spark timing value in said non-volatile memory based on said determined effect on engine torque output.

12. The method of claim 11, wherein adjusting said spark timing includes advancing and retarding said spark timing.

13. The method of claim 12, wherein adjusting said spark timing includes incrementally changing said spark timing.

14. The method of claim 11, wherein determining an effect on engine torque output includes determining a change in engine speed.

15. The method of claim 11, wherein replacing said spark timing value in said non-volatile memory includes replacing said spark timing value in said non-volatile memory when adjustment of said spark timing results in an increase in engine torque output.

16. The method of claim 15, wherein replacing said spark timing value in said non-volatile memory includes replacing said spark timing value in said non-volatile memory when adjustment of said spark timing does not result in engine knock.

17. The method of claim 11, wherein determining if engine operation is within a predetermined operating window further includes determining if an engine operating speed is within a predetermined range after each adjustment to said spark timing and returning said engine speed to within said predetermined range if outside of said predetermined range before further adjusting said spark timing.

18. The method of claim 17, wherein returning said engine speed to within said predetermined range includes commanding a throttle actuator to change an airflow into said engine.

19. The method of claim 11, further including repeatedly adjusting said spark timing, determining an effect on engine torque output as a result of adjusting said spark timing, and replacing said spark timing in said non-volatile memory based on said determined result on engine torque output until a spark timing corresponding to mean best torque of said engine is achieved.

20. The method of claim 11, wherein determining if engine operation is within a predetermined operating window includes determining if engine operation is steady-state operation.

* * * * *